(12) United States Patent
Fan et al.

(10) Patent No.: US 12,218,384 B2
(45) Date of Patent: Feb. 4, 2025

(54) EXTENDED LIFE BATTERY CELL

(71) Applicant: American Lithium Energy Corporation, Carlsbad, CA (US)

(72) Inventors: Jiang Fan, San Diego, CA (US); David Christian, San Diego, CA (US); Gerardo Jimenez, San Diego, CA (US)

(73) Assignee: American Lithium Energy Corporation, Carlsbad, CA (US)

( * ) Notice: Subject to any disclaimer, the term of this patent is extended or adjusted under 35 U.S.C. 154(b) by 0 days.

(21) Appl. No.: 17/097,522

(22) Filed: Nov. 13, 2020

(65) Prior Publication Data

US 2021/0151731 A1    May 20, 2021

Related U.S. Application Data

(60) Provisional application No. 62/935,600, filed on Nov. 14, 2019.

(51) Int. Cl.
*H01M 50/54* (2021.01)
*H01M 50/15* (2021.01)
*H01M 50/166* (2021.01)
*H01M 50/543* (2021.01)

(52) U.S. Cl.
CPC ........... *H01M 50/54* (2021.01); *H01M 50/15* (2021.01); *H01M 50/166* (2021.01); *H01M 50/543* (2021.01)

(58) Field of Classification Search
CPC .... H01M 50/54; H01M 50/543; H01M 50/15; H01M 50/166; H01M 50/184; H01M 50/188; H01M 50/186
See application file for complete search history.

(56) References Cited

U.S. PATENT DOCUMENTS

| | | | | |
|---|---|---|---|---|
| 2010/0081048 A1* | 4/2010 | Nansaka | ............. | H01M 50/561 |
| | | | | 429/178 |
| 2012/0003519 A1* | 1/2012 | Gu | ...................... | H01M 50/183 |
| | | | | 429/82 |
| 2017/0301960 A1* | 10/2017 | Menard | ................... | H01M 4/42 |
| 2020/0203679 A1* | 6/2020 | Taniuchi | ............. | H01M 50/567 |

\* cited by examiner

*Primary Examiner* — Brian R Ohara
*Assistant Examiner* — Emily Elizabeth Freeman
(74) *Attorney, Agent, or Firm* — Jones Day

(57) ABSTRACT

A battery cell may include a lid, a case, a jellyroll, and a gasket. The lid may include a first pin and a second pin. The case may form a chamber when sealed with the lid. The jellyroll may include a negative electrode having a negative electrode tab and a positive electrode having a positive electrode tab. The jellyroll may be disposed inside the chamber. The negative electrode tab may couple with the first pin to form a negative terminal of the battery cell and the positive electrode tab may couple with the second pin to form a positive terminal of the battery cell. The gasket may partially encase each of the negative electrode tab and the positive electrode tab to prevent a contact between the negative electrode tab, the positive electrode tab, and/or the case of the battery cell.

13 Claims, 7 Drawing Sheets

EXTENDED LIFE BATTERY CELL

CROSS REFERENCE TO RELATED APPLICATION

This application claims priority to U.S. Provisional Application No. 62/935,600, entitled "LONG LIFE BATTERY CELL" and filed on Nov. 14, 2019, the disclosure of which is incorporated herein by reference in its entirety.

TECHNICAL FIELD

The subject matter described herein relates generally to battery cells and more specifically to life extending features for a battery cell.

BACKGROUND

Battery life, which measures the performance and longevity of a battery cell, may be quantified as run time on a full charge (e.g., milliampere hours) and/or the number of charge cycles until the end of the battery cell's useful life. Many applications may require battery cells with an extended battery life. For example, a long battery life may be critical for battery cells used to power implantable medical devices because replacing a depleted battery cell in these circumstances may require expensive and risky surgical procedures.

SUMMARY

Systems, methods, and articles of manufacture, including batteries and battery components, are provided. In some implementations of the current subject matter, there is provided a battery cell including: a lid including a first pin and a second pin; a case configured to form a chamber when sealed with the lid; a jellyroll including a negative electrode having a negative electrode tab and a positive electrode having a positive electrode tab, the jellyroll being disposed inside the chamber, the negative electrode tab being configured to couple with the first pin to form a negative terminal of the battery cell, and the positive electrode tab being configured to couple with the second pin to form a positive terminal of the battery cell; and a gasket configured to at least partially encase each of the negative electrode tab and the positive electrode tab to prevent a contact between the negative electrode tab, the positive electrode tab, and/or the case of the battery cell.

In some variations, one or more features disclosed herein including the following features can optionally be included in any feasible combination. The gasket may include a first aperture and a second aperture. The negative electrode tab may be disposed at least partially within the first aperture while the positive electrode tab may be disposed at least partially within the second aperture.

In some variations, the gasket may include a first gasket segment and a second gasket segment. The first gasket segment may be configured to be at least partially detachable from the second gasket segment to at least enable a placement of the negative electrode tab within the first aperture and the positive electrode tab within the second aperture.

In some variations, the first gasket segment may include a first connector configured to couple with a second connector at the second gasket segment. The first gasket segment may be secured to the second gasket segment by a coupling between the first connector and the second connector.

In some variations, the first connector may include a projection and the second connector comprises a notch.

In some variations, the battery cell may further include a retention feature configured to lock the gasket in a fixed position.

In some variations, the retention feature may include a spike having a first portion inserted into the gasket and a second portion inserted into the lid.

In some variations, the retention feature may include a projection at one of the gasket and the lid. The retention feature may further include a notch at the other one of the gasket and the lid.

In some variations, the retention feature may include a protrusion along one of an exterior side wall of the gasket and an interior side wall of the case. The retention feature may further include a recess in the other one of the exterior side wall of the gasket and the interior side wall of the case.

In some variations, the first pin and the second pin may extend through feedthroughs in the lid. The gasket may be further configured to protect the feedthroughs from exposure to an electromagnetic energy used to seal the lid and the case.

In some variations, the battery cell may further include an anchoring feature configured to anchor the first pin and the second pin to the feedthroughs in the lid of the battery cell.

In some variations, the anchoring feature may include a crimp terminal coupled to the first pin and/or the second pin.

In some variations, the gasket may be disposed in a space between the lid and a top of the jellyroll.

In some variations, one or more dimensions of the gasket may correspond to a second dimension of the case of the battery cell and/or a third dimension of the space between the lid and the top of the jellyroll.

In some variations, a first shape of the gasket may correspond to a second shape of the case of the battery cell.

In some variations, the battery cell may be a cylindrical cell, a prismatic cell, a button cell, or a pouch cell.

Systems, methods, and articles of manufacture, including batteries and battery components, are provided. In some implementations of the current subject matter, there is provided a gasket including: a first aperture configured to receive at least a first portion of a negative electrode tab extending from a jellyroll of a battery cell; and a second aperture configured to receive at least a second portion of a positive electrode tab extending from the jellyroll of the battery cell, the gasket configured to encase the negative electrode tab and the positive electrode tab to prevent a contact between the negative electrode tab, the positive electrode tab, and/or a case of the battery cell.

In some variations, one or more features disclosed herein including the following features can optionally be included in any feasible combination. The gasket may further include a first gasket segment and a second gasket segment. The first gasket segment may be configured to be at least partially detachable from the second gasket segment to at least enable a placement of the negative electrode tab within the first aperture and the positive electrode tab within the second aperture.

In some variations, the gasket may further include a retention feature configured to lock the gasket in a fixed position. The retention feature may include a first portion configured to couple with a second portion. The first portion may be at the gasket and the second portion may be at the lid and/or the case.

In some variations, a first dimension of the gasket may correspond to a second dimension of the case of the battery cell and/or a third dimension of a space between the lid and the top of the jellyroll in which the gasket is disposed.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
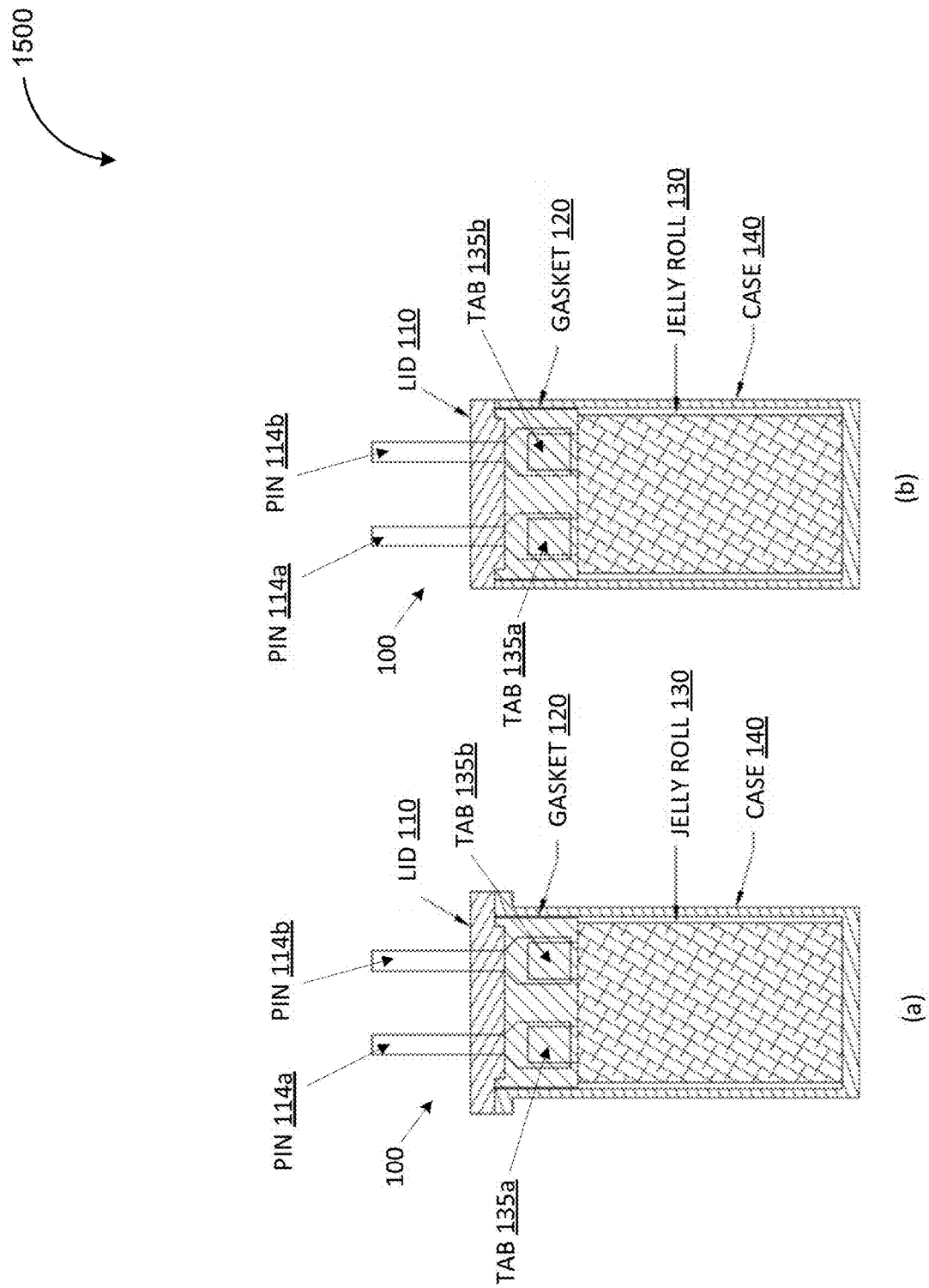
FIG. 1(a) depicts a schematic diagram illustrating an example of a battery cell consistent with implementations of the current subject matter.
FIG. 1(b) depicts a schematic diagram illustrating another example of a battery cell consistent with implementations of the current subject matter.

A battery cell may include a metal case containing a jellyroll formed to include a negative electrode, a separator, and a positive electrode of the battery cell. The jellyroll may be disposed inside a case that is sealed to a lid. A negative electrode tab may extend from the negative electrode while a positive electrode tab may extend from the positive electrode. The negative electrode tab and the positive electrode tab may form the terminals of the battery cell when coupled, for example, with corresponding pins extending through feedthroughs in the lid of the battery cell. Leaving the negative electrode tab and/or the positive electrode tab exposed may render the battery cell susceptible to developing an internal short. For example, an internal short may develop if the exposed electrode tabs come into contact with each other and/or with the case of the battery cell However, insulating the negative tab and the positive tab with adhesive tape may fail to extend the longevity of the battery cell because conventional adhesive tapes degrade over time such that the risk of an internal short may still arise.

Accordingly, in some example implementations of the current subject matter, a battery cell may include one or more mechanisms for extending the longevity of the battery cell. For example, the battery cell may include a gasket configured to insulate the negative electrode tab and the positive electrode tab of the battery cell. Leaving the electrode tabs exposed may render the battery cell susceptible to developing an internal short but insulating the electrode tabs with conventional adhesive tape does not provide adequate protection. As such, used in place of conventional adhesives, the gasket may prolong the life of the battery cell at least because gasket may be formed from an insulating material that is less reactive than conventional adhesive tape and is therefore less prone to degradation. Moreover, the gasket may protect the feedthroughs in the lid of the battery cell from damage when the battery cell is being sealed, for example, by laser welding and/or the like. For instance, electromagnetic energy such as laser may be used to form a hermitic seal between the lid and the case of the battery cell. The beam of electromagnetic energy and the concomitant heat may damage the feedthroughs in the lid of the battery cell including by compromising the seals that are formed around the pins inserted through the feedthroughs. The presence of the gasket may therefore extend the longevity of the battery cell by protecting the feedthroughs from damage caused by exposure to the electromagnetic energy.

In some implementations of the current subject matter, the tabs and the pins may be anchored to the feedthrough in order to prevent deformation caused by subsequent manufacturing operations such as, for example, crimping of the portion of the pins extending beyond the lid of the battery cell. For examples, the tabs and/or the pins may be anchored to the feedthrough by at least bending the tabs and/or the pins to conform to the interior surface of the lid. Alternatively and/or additionally, the tabs and/or the pins may be anchored to the feedthrough by at least being welded (e.g., by laser welding and/or the like) to the feedthrough and/or the interior surface of the lid. The tabs and/or the pins of the battery cell may also be coupled with a anchoring feature, such as a crimp terminal, configured to anchor the tabs and/or the pins to the feedthrough of the lid of the battery cell.

FIG. 1 depicts examples of a battery cell 100 consistent with implementations of the current subject matter. Referring to FIG. 1, the battery cell 100 may include a jellyroll 130 that is disposed inside a case 140 sealed by a lid 110. For example, the open top of the case 140 of the example of the battery cell 100 show in FIG. 1(a) may include a flange extending beyond the side walls of the case 140 whereas the sidewalls of the case 140 of the example of the battery cell 100 shown in FIG. 1(b) is flush. The battery cell 100 may be any type of battery cell including, for example, a lithium ion battery cell, a sodium ion battery cell, and/or the like. The battery cell 100 may be a non-rechargeable primary battery cell or a rechargeable secondary battery cell. Moreover, although the examples of the battery cell 100 shown in FIG. 1 are cylindrical battery cells, it should be appreciated that the battery cell 100 may have a different format including, for example, a button battery cell, a prismatic cell, a pouch cell, and/or the like.

As shown in FIG. 1, the battery cell 100 may include a first electrode tab 135a and a second electrode tab 135b extending from the jellyroll 130. For example, the first electrode tab 135a may be a negative electrode tab coupled with a negative electrode included in the jellyroll 130 while the second electrode tab 135b may be a positive electrode tab coupled with a positive electrode included in the jellyroll 130. Moreover, the first electrode tab 135a and the second electrode tab 135b may be coupled with a first pin 114a and a second pin 114b extending through the lid 110 of the battery cell 100, for example, through feedthroughs in the lid 110 of the battery cell 100. This coupling between the electrode tabs 135 and the pins 114 may form the terminals of the battery cell 100. The electrode tabs 135 may be formed from a metal and/or a metal alloy including, for example, aluminum (Al), titanium (Ti), platinum (Pt), gold (Au), and/or the like. The pins 114 may be formed from a metal and/or a metal alloy with a high melting point (e.g., >1000° C.) such as platinum (Pt), iridium (Ir), and/or the like.

Leaving the electrode tabs 135 exposed may render the battery cell 100 susceptible to developing an internal short, for example, when the first electrode tab 135a and the second electrode tab 135b come into contact with each other and/or with the case 140. However, insulating the electrode tabs 135 with conventional adhesive tape may provide inadequate protection at least because conventional adhesive tape is prone to degradation over time. Accordingly, in some implementations of the current subject matter, the battery cell 100 may include one or more mechanisms for extending the longevity of the battery cell m100. For example, the examples of the battery cell 100 shown in FIG. 1 may include a gasket 120 configured to insulate the electrode tabs 135 coupled with the pins 114.

In addition to insulating the electrode tabs 135 to prevent an internal short, the gasket 120 may also extend the longevity of the battery cell by protecting the battery cell 100 during manufacturing and assembly. For example, the lid 110 may be sealed to the case 140 by use of electromagnetic energy such as laser welding and/or the like. The beam of electromagnetic energy and the concomitant heat may cause inadvertent damage to the feedthroughs in the lid 110 of the battery cell 100 including by compromising the seals that are formed around the pins 114 inserted through the feedthroughs. The presence of the gasket 120 may therefore extend the longevity of the battery cell 100 by protecting the feedthroughs from being damaged by the electromagnetic energy used to seal the battery cell 100.

Figure 2:
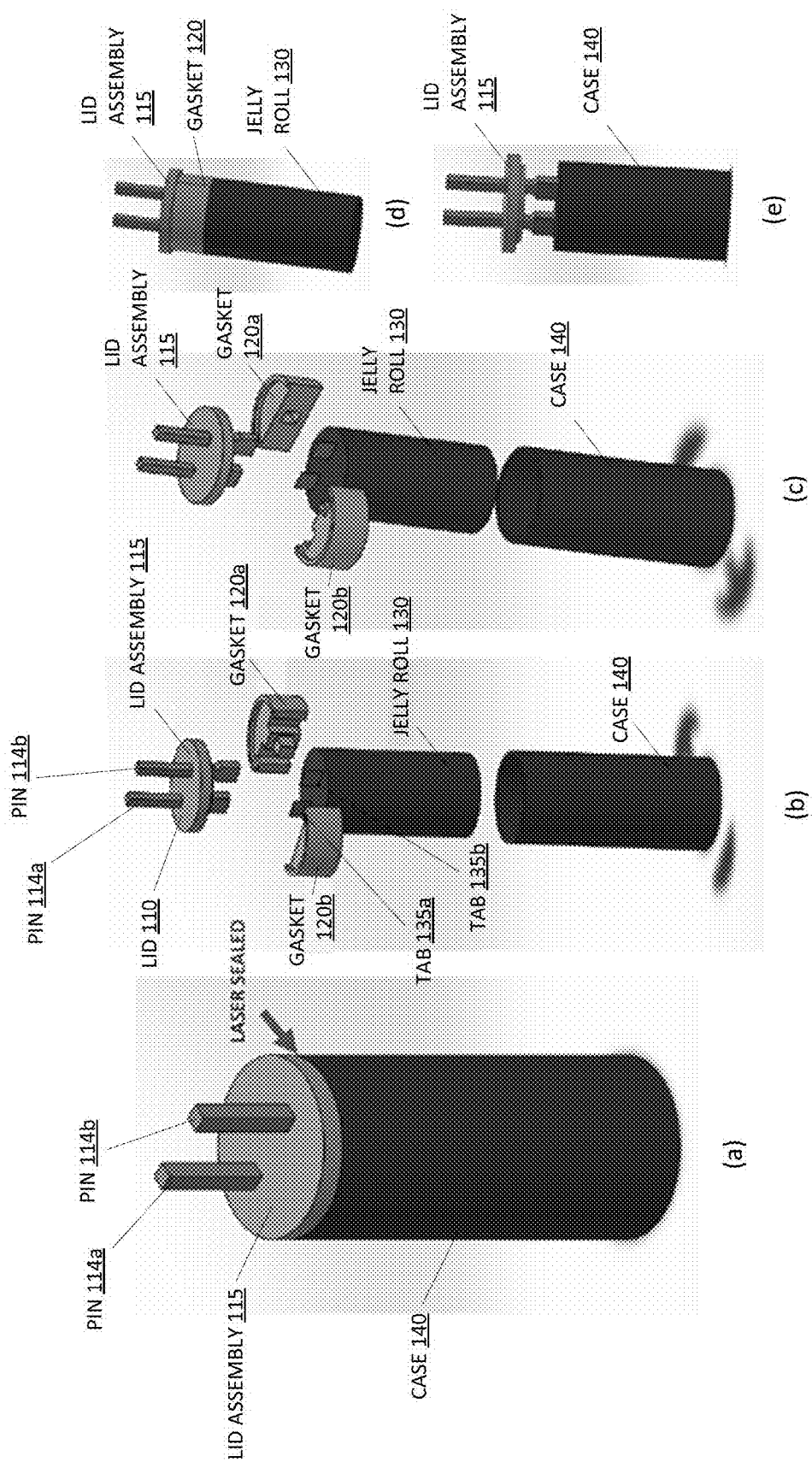
FIG. 2(a) depicts a perspective view of an example of a battery cell consistent with implementations of the current subject matter.
FIG. 2(b) depicts an exploded view of an example of a battery cell consistent with implementations of the current subject matter
FIG. 2(c) depicts another exploded view of an example of a battery cell consistent with implementations of the current subject matter.
FIG. 2(d) depicts a perspective view of an interior of an example of a battery cell consistent with implementations of the current subject matter.
FIG. 2(e) depicts a perspective view of an interior of another example of a battery cell consistent with implementations of the current subject matter.

FIG. 2 depicts various view of an example of the battery cell 100 consistent with implementations of the current subject matter. Referring to FIG. 2, the battery cell 100 may include a lid assembly 115 that is coupled to the case 140, for example, by laser welding and/or the like, to form a hermitically sealed chamber containing the jellyroll 130. In the exploded view of the battery cell 100 shown in FIGS. 2(b)-(c), it can be seen that the lid assembly 115 may include the first pin 114a and the second pin 114b inserted through the lid 110. Moreover, the gasket 120 may include a first gasket segment 120a that is configured to be fully or partially detachable from a second gasket segment 120b. For example, as shown in FIGS. 2(b)-(c), the pins 114 coupled with the electrode tabs 135 may be positioned within the gasket 120 when the first gasket segment 120a is at least partially disengaged from the second gasket segment 120b.

Referring to FIG. 2(d), once the pins 114 and the electrode tabs 135 are in place, the first gasket segment 120a and the second gasket segment 120b may be engaged in order to encase the pins 114 coupled with the electrode tabs 135 at least partially within the gasket 120. As shown in FIG. 2(e), in the absence of the gasket 120, the pins 114 coupled with the electrode tabs 135 may be left exposed, rendering the battery cell 100 susceptible to developing an internal short. Contrastingly, as shown in FIGS. 2(b)-(d), the gasket 120 may surround each of the pins 114 coupled with the electrode tab 135 such that the pins 114 and the electrode tab 135 are separate from each other and from the case 140. Doing so may prevent an internal short by at least preventing the pins 114 and the electrode tabs 135 from coming into contact with each other and/or the case 140.

Figure 3:
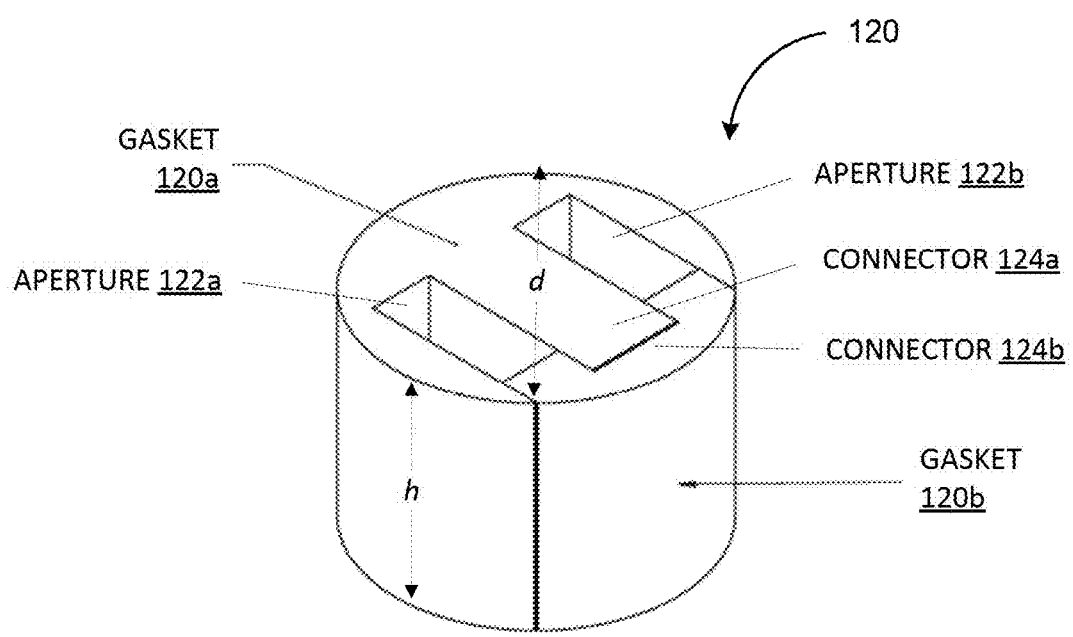
FIG. 3 depicts a perspective view of an example of a gasket consistent with implementations of the current subject matter.

FIG. 3 depicts a perspective view of an example of the gasket 120 consistent with implementations of the current subject matter. FIG. 3 shows the first gasket segment 120a engaged with the second gasket segment 120b. In some implementations of the current subject matter, a shape and/or a contours of the gasket 120 may correspond to that of the battery cell 100. For example, the gasket 120 may be substantially cylindrical (e.g., when the first gasket segment 120a is engaged with the second gasket segment 120b) in order to conform, at least partially, to the interior of the chamber formed by sealing the lid 110 and the case 140 of the battery cell 100. Alternatively and/or additionally, one or more dimensions of the gasket 120 may correspond to one or more dimensions of the battery cell 100 such that the gasket 120 is disposed in a space between a top of the jellyroll 130 and the lid 110 of the battery cell 100. For instance, the height h of the gasket 120 may correspond to a height of a space between the top of the jellyroll 130 and the lid 110 of the battery cell 100. Moreover, the diameter d (or the length l and/or width w) of the gasket 120 may also correspond to that of the battery cell 100.

As shown in FIG. 3, the gasket 120 may include a first aperture 122a configured to accommodate the first pin 114a coupled with the first electrode tab 135a and a second aperture 122b configured to accommodate the second pin 114b coupled with the second electrode 135b. That is, when the first gasket segment 120a and the second gasket segment 120b are engaged, the first pin 114a coupled with the first electrode 135a may be disposed within the first aperture 122*a* while the second pin 114*b* coupled with the second electrode 135*b* may be disposed within the second aperture 122*b*. Disengaging the first gasket segment 120*a* from the second gasket segment 120*b* may provide access to the first aperture 122*a* and/or the second aperture 122*b* such that the the first pin 114*a* coupled with the first electrode 135*a* may be positioned within the first aperture 122*a* and the second pin 114*b* coupled with the second electrode 135*b* may be positioned within the second aperture 122*b* before the first gasket segment 120*a* is engaged with the second gasket segment 120*b*.

Moreover, as shown in FIG. 3, the first gasket segment 120*a* may include a first connector 124*a* configured to couple with a second connector 124*b* at the second gasket segment 120*b*. For example, in the example of the gasket 120 shown in FIG. 3, the first connector 124*a* may be a projection (e.g., a tenon and/or the like) while the second connector 124*b* may be a notch (e.g., a recess, a mortise, and/or the like). The coupling of between the first connector 124*a* and the second connector 124*b* may therefore secure the first gasket segment 120*a* to the second gasket segment 120*b* through friction fit and/or the like.

Figure 4:
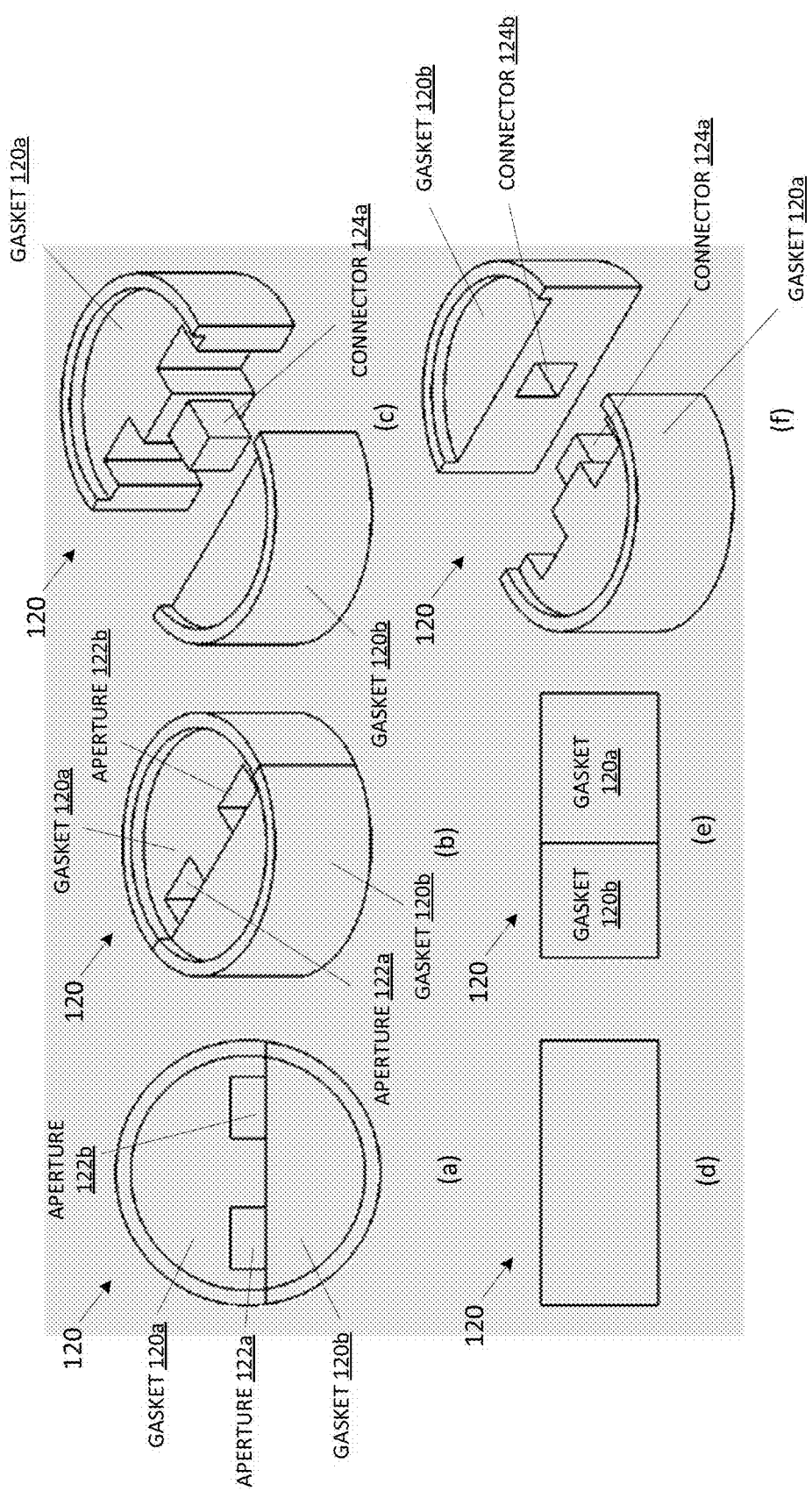
FIG. 4(a) depicts a planar view of an example of a gasket consistent with implementations of the current subject matter.
FIG. 4(b) depicts a perspective view of an example of a gasket consistent with implementations of the current subject matter
FIG. 4(c) depicts an exploded view of an example of a gasket consistent with implementations of the current subject matter.
FIG. 4(d) depicts a side view of an example of a gasket consistent with implementations of the current subject matter.
FIG. 4(e) depicts another side view of an example of a gasket consistent with implementations of the current subject matter.
FIG. 4(f) depicts another exploded view of an example of a gasket consistent with implementations of the current subject matter.

FIG. 4 depict various views of an example of the gasket 120 consistent with implementations of the current subject matter. As shown in FIGS. 4(*c*) and (*f*), the gasket 120 may include another example of the first connector 124*a* and the second connector 124*b* that extends partially through a vertical axis of the gasket 120.

In some implementations of the current subject matter, the gasket 120 may include one or more retention features configured to prevent a movement (e.g., a rotational shift, a horizontal shift, a vertical shift, and/or the like) of the gasket 120 once the gasket 120 is placed inside the case 140. For example, the retention feature may include a first portion at the gasket 120 that is configured to couple with a second portion at the lid 110 and/or the case 140.

Figure 5:
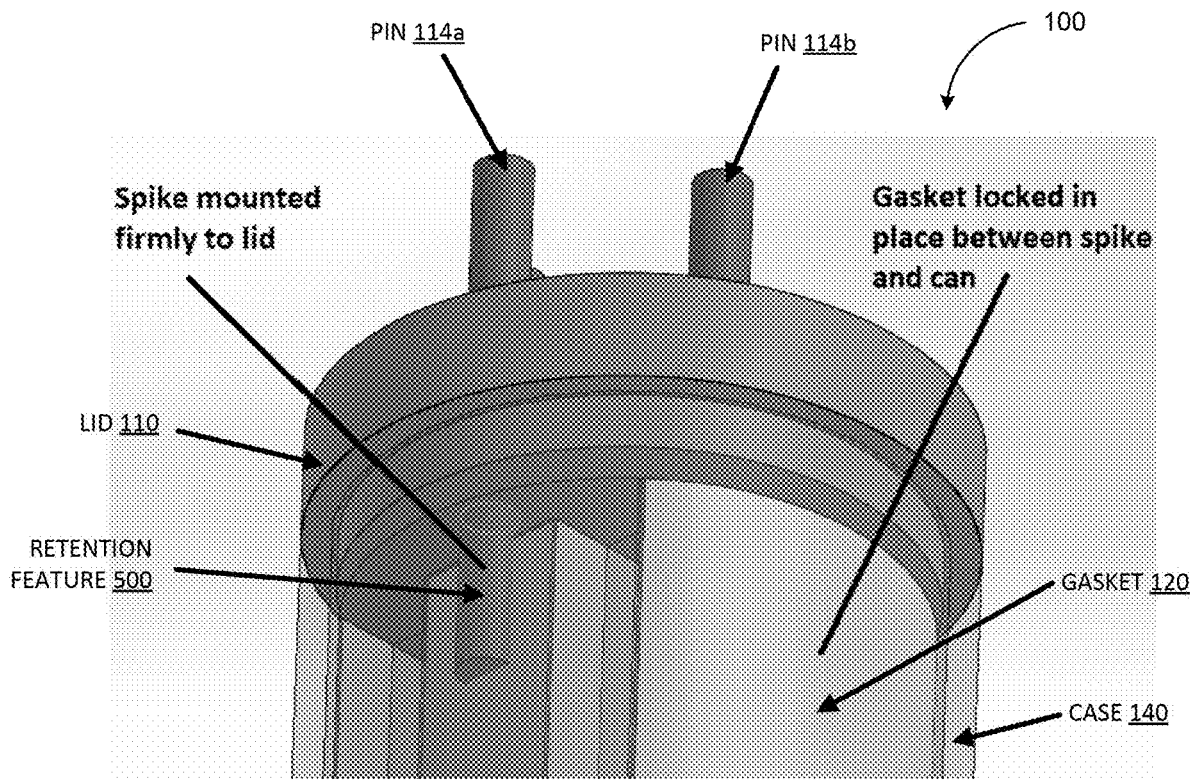
FIG. 5 depicts a transparent view of a battery cell including an example of a retention feature consistent with implementations of the current subject matter.

FIG. 5 depicts a transparent view of the battery cell 100 including an example of a retention feature 500 consistent with implementations of the current subject matter. Referring to FIG. 5, the retention feature 500 may be a spike that is inserted at least partially into the gasket 120 as well as the lid 110 in order to lock the gasket 120 in a fixed position relative to the lid 110. For example, a first portion of the spike may be inserted into a top side of the gasket 120 while a second portion of the spike may protrude from the top side of the gasket 120 and inserted into an underside of the lid 110. Instead of being a spike that is inserted into the gasket 120 and the lid 110, the retention feature 500 may be a notch in the gasket 120 (or the lid 110) that is configured to mate with a corresponding recess in the lid 110 (or the gasket 120). Alternatively and/or additionally, the retention feature 500 may include one or more protrusions along an exterior side wall of the gasket 120 (or the interior side wall of the case 140) that are configured to mate with corresponding recesses along an interior side wall of the case 140 (or the exterior side wall of the gasket 120).

In some implementations of the current subject matter, the pins 114 as well as the electrode tabs 135 coupled to the pins 114 may be anchored to the feedthrough in the lid 110 in order to prevent deformation caused by subsequent manufacturing operations such as, for example, crimping of the portion of the pins 114 extending beyond the lid 110 of the battery cell 100. For examples, the pins 114 as well as the electrode tabs 135 coupled to the pins 114 may be anchored to the feedthrough in the lid 110 by at least bending the electrode tabs 135 and/or the pins 114 to conform to the interior surface of the lid 110. Alternatively and/or additionally, the pins 114 as well as the electrode tabs 135 coupled to the pins 114 may be welded (e.g., by laser welding and/or the like) to the feedthrough and/or the interior surface of the lid 110 in order to anchor the electrode tabs 135 and/or the pins 114 to the feedthrough in the lid 110.

Figure 6:
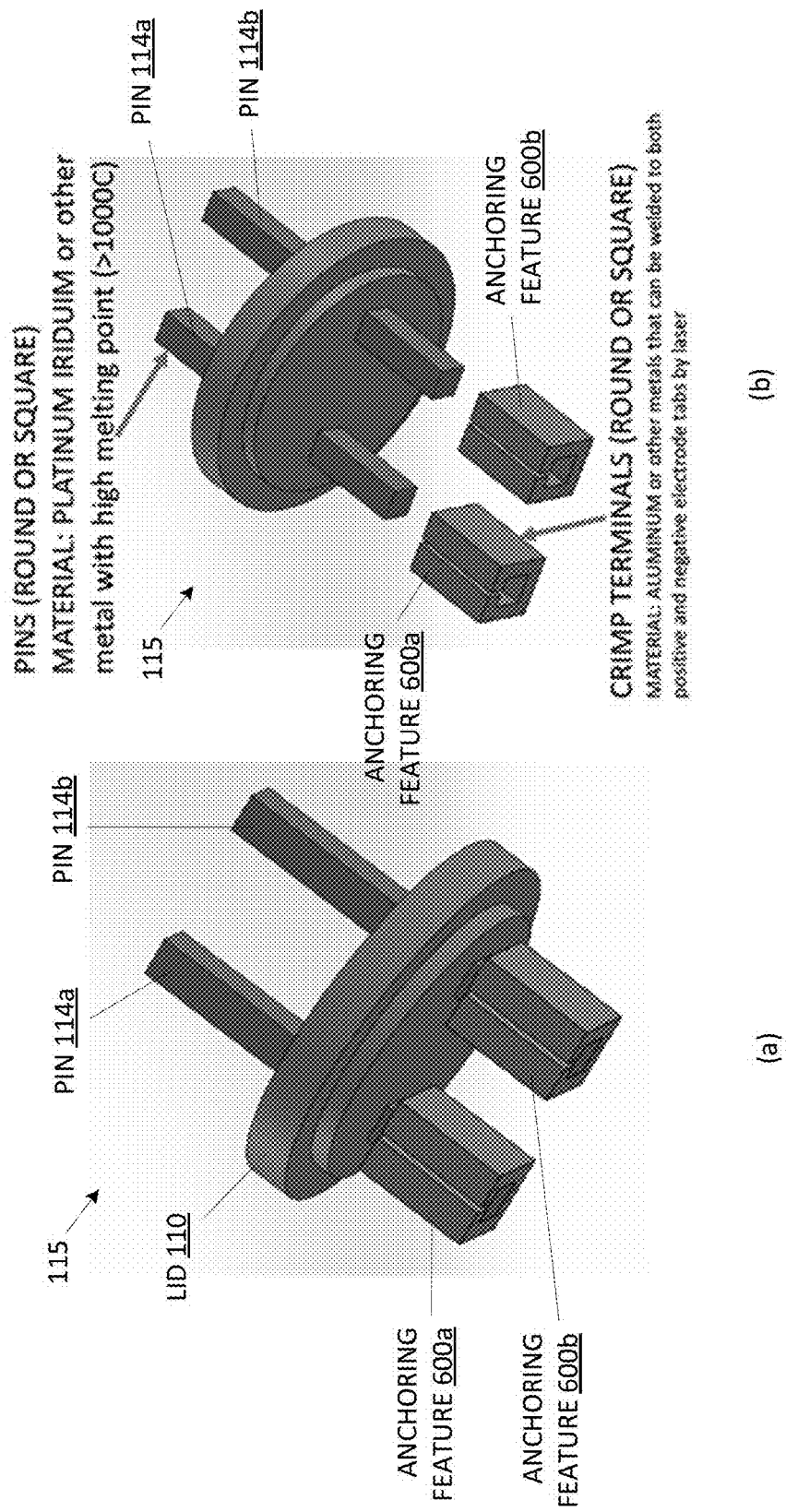
FIG. 6(a) depicts a perspective view of an example of a lid assembly having an anchoring feature consistent with implementations of the current subject matter.
FIG. 6(b) depicts an exploded view of an example of a lid assembly having an anchoring feature consistent with implementations of the current subject matter.

The pins 114 and/or the electrode tabs 135 coupled to the pins 114 may also be coupled with an anchoring feature, such as a crimp terminal, configured to anchor the electrode tabs 135 and/or the pins 114 to the feedthrough in the lid 110 of the battery cell 100. FIG. 6 depicts various views of an example of the lid assembly 115 with battery tabs having an anchoring feature 600 consistent with implementations of the current subject matter. The anchoring feature 600 shown in FIG. 6 may include a crimp terminal that is coupled, for example, by welding, to each of the first electrode tab 135*a* (and/or the first pin 114*a*) and the second electrode tab 135*b* (and/or the second pin 114*b*). The crimp terminal may be in any shape including, as shown in FIG. 6, circular, rectangular, and/or the like.

Figure 7:
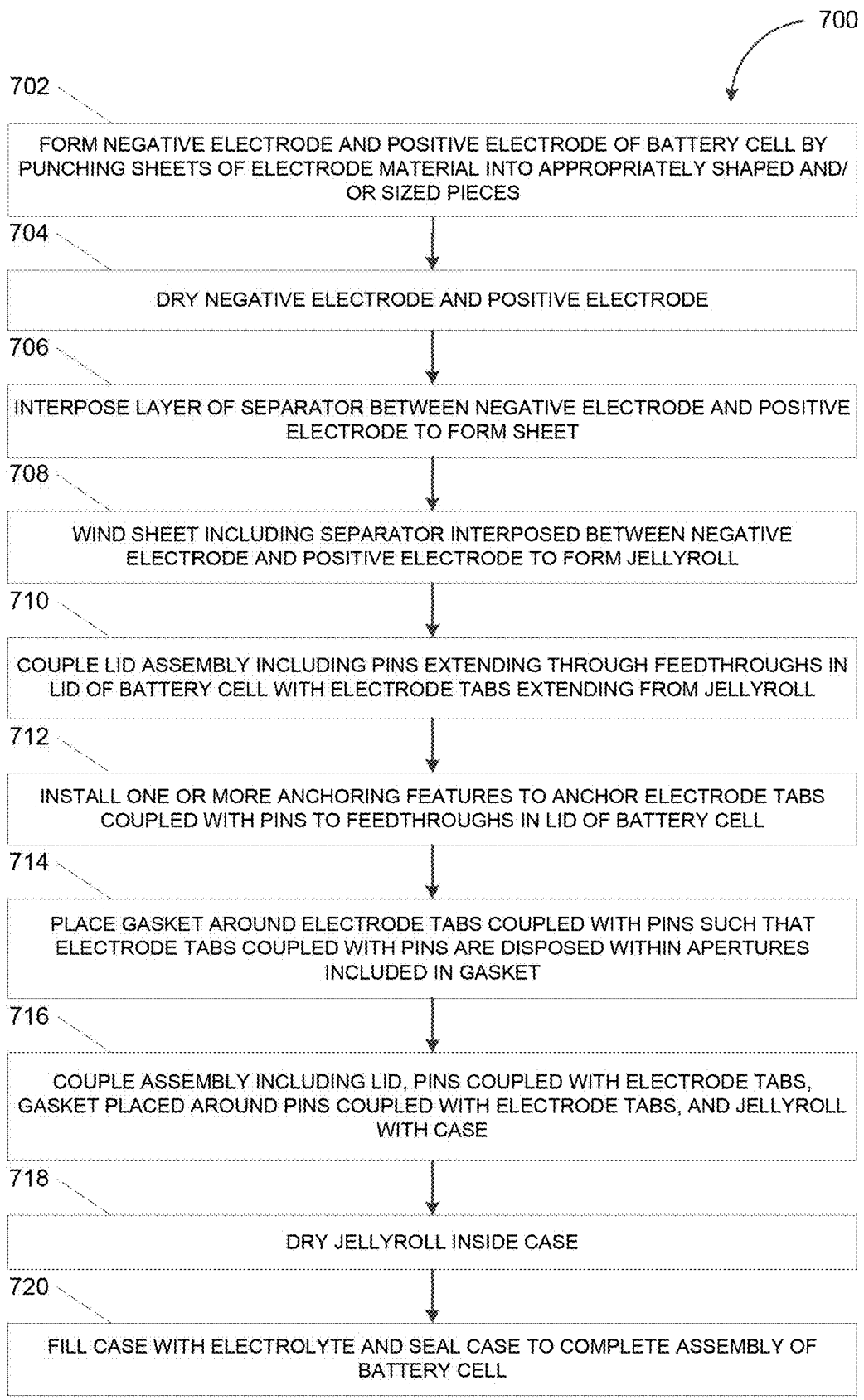
FIG. 7 depicts a flowchart illustrating a process for assembling a battery cell consistent with implementations of the current subject matter.

FIG. 7 depicts a flowchart illustrating a process 700 for assembling a battery cell consistent with implementations of the current subject matter. Referring to FIGS. 1-7, the process 700 may be performed in order to assemble the battery cell 100.

The negative electrode and positive electrode of the battery cell may be formed by punching sheets of electrode material into appropriately shaped and/or sized pieces (702). For instance, sheets of positive electrode material and/or negative electrode material may be punched into appropriately shaped and/or sized pieces.

The negative electrode and the positive electrode of the battery cell may be dried (704). For example, the positive electrode of the battery cell 100 may be dried at 125° C. for 10 hours while the negative electrode of the battery cell may be dried at 140° C. for 10 hours.

A layer of separator may be interposed between the positive electrode and the negative electrode to form a sheet (706). For instance, a layer of separate may be laminated the positive electrode and the negative electrode of the battery cell 100 to form a sheet.

The sheet including the separator interposed between the positive electrode and the negative electrode may be wound to form a jelly roll (708). For example, the sheet including the separator interposed between the positive electrode and the negative electrode may be wound around a mandrel to form the jellyroll 130.

A lid assembly including pins extending through feedthroughs in a lid of the battery cell may be coupled with the electrode tabs extending from the jelly roll (710). For example, the lid assembly 115, which includes the first pin 114*a* and the second pin 114*b* extending through feedthroughs in the lid 110, may be coupled with the electrode tabs 135 including by coupling the first pin 114*a* with the first electrode tab 135*a* and the second pin 114*b* with the second electrode tab 135*b*.

One or more anchoring features may be installed to anchor the electrode tabs coupled with the pins to the feedthrough in the lid of the battery cell (712). For example, the first anchoring feature 600*a* may be coupled with the first electrode tab 135*a* (and/or the first pin 114*a*) and the second anchoring feature 600*b* may be coupled with the second electrode tab 135*b* (and/or the second pin 114*b*) in order to anchor the electrode tabs 135 and the pins 114 to the feedthrough in the lid 110 of the battery cell 100. This anchoring may prevent the electrode tabs 135 and the pins 114 from be deformed during subsequent manufacturing operations such as, for example, crimping portions of the pins 114 that extend beyond the lid 110 of the battery cell 100.

A gasket may be placed around the electrode tabs coupled with the pins such that the electrode tabs coupled with the pins are disposed within apertures included in the gasket (714). For example, the gasket 120 may include the first gasket segment 120*a* and the second gasket segment 120*b* which may be at least partially detachable from one another to allow a placement of the first electrode tab 135*a* (and/or the first pin 114*a*) in the first aperture 122*a* and the second electrode tab 135*b* (and/or the second pin 114*b*) in the second aperture 122*b*. As shown in FIGS. 2-4, the first gasket segment 120*a* may include the first connector 124*a* and the second gasket segment 120*b* may include the second connector 124*b*. Once the first electrode tab 135*a* (and/or the first pin 114*a*) in disposed within the first aperture 122*a* and the second electrode tab 135*b* (and/or the second pin 114*b*) is disposed within the second aperture 122*b*, the first gasket segment 120*a* may be coupled with the second gasket segment 120*b* including by engaging the first connector 124*a* with the second connector 124*b*. Moreover, as shown in FIG. 5, the gasket 120 may include the retention feature 500 configured to lock the gasket 120 in a fixed position relative to the lid 110. For instance, the retention feature 500 may be a protrusion (e.g., a spike and/or the like) that mates with a corresponding notch to prevent a movement (e.g., a rotational shift, a horizontal shift, a vertical shift, and/or the like) of the gasket 120 once the gasket is placed inside the case 140

An assembly including the lid, the pins coupled with the electrode tabs, the gasket placed around the pins coupled with the electrode tabs, and the jelly roll may be coupled with a case (716). For instance, an assembly including the lid 110, the pins 114 coupled with the electrode tabs 135, the gasket 120 placed around the pins 114 coupled with the electrode tabs 135, and the jelly roll 130 may be coupled with the case 140 with the jellyroll 130 and the gasket 120 being disposed inside the chamber that is formed by the case 140 and the lid 110.

The jellyroll may be dried inside the case (718). For example, the jellyroll 130 inside the case 140 may be dried at 70° C. for 10 hours.

The case may be filled with electrolyte and sealed to complete the assembly of the battery cell (720). For example, the case 140 may be filled with a liquid electrolyte, a solid state electrolyte, a solid-liquid hybrid electrolyte and/or the like. Moreover, the lid 110 may be sealed to the case 140 to form a hermetically sealed chamber containing the gasket 120 and the jellyroll 130. As noted, the presence of the gasket 120 may protect the feedthroughs from damage caused by the electromagnetic energy that may be used to seal the lid 110 to the case 140. In some cases, the assembled battery cell 100 may also be aged, such as for 36 hours (or a different quantity of time).

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together."

A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A battery cell, comprising:
a lid including a first pin and a second pin;
a case forming a chamber when sealed with the lid;
a jellyroll including a negative electrode having a negative electrode tab and a positive electrode having a positive electrode tab, the jellyroll being disposed inside the chamber, the negative electrode tab coupling with the first pin to form a negative terminal of the battery cell, and the positive electrode tab coupling with the second pin to form a positive terminal of the battery cell; and
a gasket disposed in a space between the lid and a top of the jellyroll, the gasket having a same shape, a same height, and a same diameter as the space between the lid and the top of the jellyroll such that the gasket occupies an entirety of the space between the lid and the top of the jellyroll, the gasket including a first gasket segment joined with a second gasket segment that is separate and detachable from the first gasket segment, the first gasket segment including two recesses along a surface of the first gasket segment joining with the second gasket segment, the two recesses forming a first aperture and a second aperture through the gasket when the first gasket segment is joined with the second gasket segment, the negative electrode tab being disposed at least partially within the first aperture and the positive electrode tab being disposed at least partially within the second aperture such that the gasket encases each of the negative electrode tab and the positive electrode tab to prevent a contact between the negative electrode tab, the positive electrode tab, and/or the case of the battery cell, and the gasket further including a retention feature that locks the gasket in a fixed position within the battery cell in order to prevent the gasket from rotating within the battery cell.

2. The battery cell of claim 1, wherein the first gasket segment includes a first connector that secures the first gasket segment to the second gasket segment by at least coupling with a second connector in the second gasket segment.

3. The battery cell of claim 2, wherein the first connector comprises a projection from the surface of the first gasket segment joining the second gasket segment and the second connector comprises a notch in a corresponding surface of the second gasket segment.

4. The battery cell of claim 1, wherein the retention feature comprises a spike having a first portion inserted into the gasket and a second portion inserted into the lid.

5. The battery cell of claim 1, wherein the retention feature comprises a projection at one of the gasket and the lid, and wherein the retention feature further comprise a notch at the other one of the gasket and the lid.

6. The battery cell of claim 1, wherein the retention feature comprises a protrusion along one of an exterior side wall of the gasket and an interior side wall of the case, and wherein the retention feature further comprises a recess in the other one of the exterior side wall of the gasket and the interior side wall of the case.

7. The battery cell of claim 1, wherein the first pin and the second pin extend through feedthroughs in the lid, and wherein the gasket protects the feedthroughs from exposure to an electromagnetic energy used to seal the lid and the case.

8. The battery cell of claim 7, further comprising an anchoring feature securing the first pin and the second pin to the feedthroughs in the lid of the battery cell.

9. The battery cell of claim 8, wherein the anchoring feature includes a crimp terminal coupled to the first pin and/or the second pin.

10. The battery cell of claim 1, wherein the battery cell comprises a cylindrical cell, a prismatic cell, a button cell, or a pouch cell.

11. A gasket, the gasket having a same shape, a same height, and a same diameter as a space between a lid of a battery cell and a top of a jellyroll of the battery cell such that the gasket occupies an entirety of the space between the lid and the top of the jellyroll, the gasket further comprising:

a first gasket segment joined with a second gasket segment that is separate and detachable from the first gasket segment, the first gasket segment including two recesses along a surface of the first gasket segment joining with the second gasket segment, the two recesses forming a first aperture and a second aperture through the gasket when the first gasket segment is joined with the second gasket segment, the first aperture receiving at least a portion of a negative electrode tab extending from the jellyroll, the second aperture receiving at least a portion of a positive electrode tab extending from the jellyroll, and the gasket encasing the negative electrode tab and the positive electrode tab to prevent a contact between the negative electrode tab, the positive electrode tab, and/or a case of the battery cell; and a retention feature locking the gasket in a fixed position within the battery cell in order to prevent the gasket from rotating within the battery cell.

12. The gasket of claim 11, wherein the gasket includes a first portion of the retention feature that couples with a second portion of the retention feature disposed in the lid and/or the case of the battery cell.

13. The battery cell of claim 1, wherein the lid includes a protrusion that is disposed towards the top of the jellyroll when the lid is coupled with the case, wherein the gasket includes a flange protruding from at least a portion of a rim of the gasket, and wherein the flange is interposed in a space between a side of the case and the protrusion in the lid.

* * * * *